United States Patent [19]

Kishi et al.

[11] 4,456,903

[45] Jun. 26, 1984

[54] OPTICAL SIGNAL TRANSMISSION SYSTEM FOR AN AUTOMOTIVE VEHICLE

[75] Inventors: Norimasa Kishi; Kiyoshi Sasanuma; Yasuhisa Takeuchi, all of Yokosuka; Shinichi Kato, Fujisawa, all of Japan

[73] Assignee: Nissan Motor Company, Ltd., Kanagawa, Japan

[21] Appl. No.: 247,079

[22] Filed: Mar. 24, 1981

[30] Foreign Application Priority Data

| Mar. 25, 1980 | [JP] | Japan | 55-37759 |
| Mar. 25, 1980 | [JP] | Japan | 55-37760 |
| Mar. 25, 1980 | [JP] | Japan | 55-37761 |

[51] Int. Cl.³ .............................. B60Q 1/00
[52] U.S. Cl. ............................ 340/54; 180/78;
    250/551; 307/10 R; 340/531; 350/96.2;
    455/602; 455/612; 455/613
[58] Field of Search .................. 340/52 R, 53, 54;
    200/61.54; 307/9, 10 R; 180/78; 250/215, 221,
    551; 350/96.20; 455/602, 612, 613

[56] References Cited

U.S. PATENT DOCUMENTS

| 3,106,981 | 10/1963 | Chakiris | 340/53 X |
| 3,544,743 | 12/1970 | Takei et al. | 200/61.54 |
| 3,773,990 | 11/1973 | Maci | 200/61.54 |
| 4,013,342 | 3/1977 | Narodny | 350/96.20 |
| 4,045,667 | 8/1977 | Hanson . | |
| 4,175,230 | 11/1979 | Richards et al. | 455/613 X |
| 4,190,318 | 2/1980 | Upton, Jr. | 250/551 X |
| 4,278,323 | 7/1981 | Waldman | 250/551 X |
| 4,321,474 | 3/1982 | Tanaka et al. | 455/602 X |

FOREIGN PATENT DOCUMENTS

| 2237695 | 2/1974 | Fed. Rep. of Germany . |
| 2717974 | 12/1977 | Fed. Rep. of Germany . |
| 2839127 | 3/1980 | Fed. Rep. of Germany . |
| 539741 | 9/1941 | United Kingdom . |
| 1332334 | 10/1973 | United Kingdom . |
| 1462052 | 1/1977 | United Kingdom . |
| 1510462 | 5/1978 | United Kingdom . |
| 1538485 | 1/1979 | United Kingdom . |
| 2007355 | 5/1979 | United Kingdom . |

Primary Examiner—David L. Trafton
Assistant Examiner—Joseph Nowicki
Attorney, Agent, or Firm—Schwartz, Jeffery, Schwaab, Mack, Blumenthal & Koch

[57] ABSTRACT

An optical signal transmission system for an automotive vehicle by which a number of electric signals generated from switches arranged on the steering wheel are transferred to other controllers optically and digitally for control the necessary vehicle operating conditions with high reliability, without producing electrical noise even while steering wheel is being turned. The optical signal transmission system of the present invention comprises optical transmission devices including an electricity-to-light converting means, a light-transmitting ring, a light-to-electricity converting means, in addition to a digital circuit including an encoder, decoder, etc.

31 Claims, 29 Drawing Figures

(a)

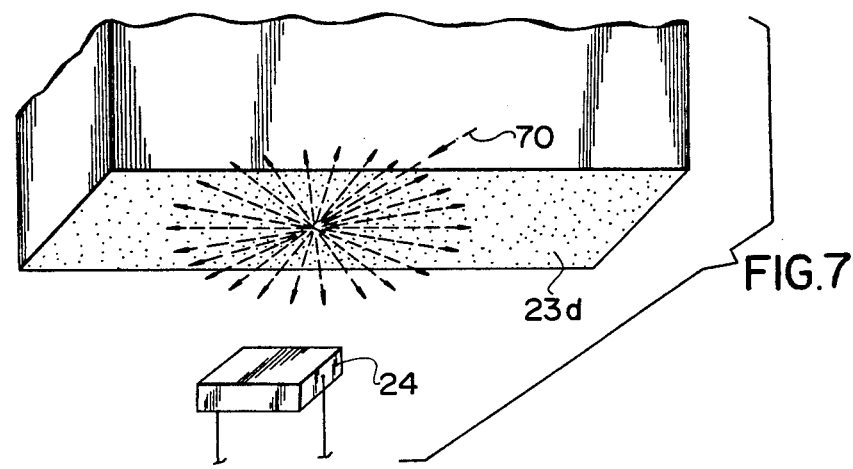
FIG.7
FIG.8
(a)
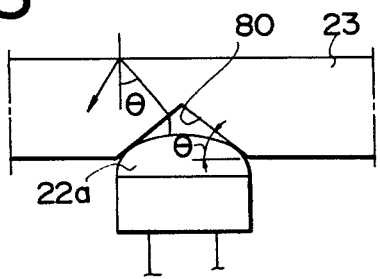
FIG.8
(b)
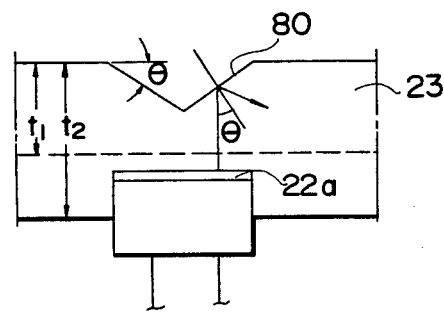
FIG.8
(c)
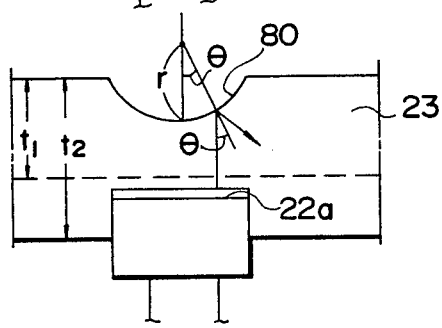

(a)

(a)

(b)

(a)

(a)

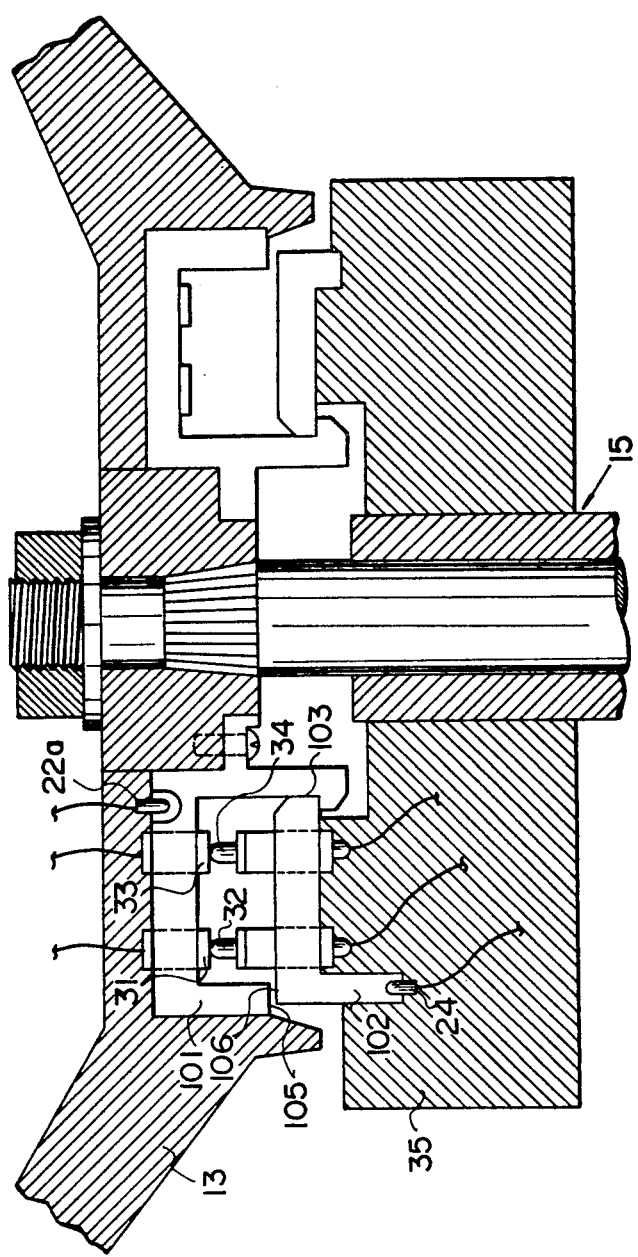

4,456,903

OPTICAL SIGNAL TRANSMISSION SYSTEM FOR AN AUTOMOTIVE VEHICLE

BACKGROUND OF THE INVENTION

1. Field of the Invention

The present invention relates generally to an optical signal-transmission system for an automotive vehicle, and more particularly to an optical signal-transmission device such that a number of electric control signals generated from switches arranged on the steering wheel are transferred digitally and optically to other controllers to control the vehicle operating conditions with a high reliability without producing electrical noise, even wen the steering wheel is freely turned.

2. Description of the Prior Art

As is well known, there is a need to generate a number of control signals from switches arranged on the steering wheel and to transfer these signals to other control systems provided on the vehicle body, such as an automatic speed cruise control device (ASCD).

Although described in more detail hereinafter, when a mechanical signal-transmission device is used for this purpose it is necessary to arrange a sliding contact mechanism including for instance slip rings and sliding contact points in a relatively small area behind the steering wheel. In this mechanism however there are a number of problems or shortcomings; for example it is difficult to increase the number of switches since the area behind the steering wheel is too small to accommodate many slip rings; the sliding contact mecanism is readily affected by fluctuations of the supply voltage; chattering of the contact points or electrical noise caused by the contact points is inevitable, thus reducing the reliability and limiting the increase of the use of such control signals.

SUMMARY OF THE INVENTION

With these problems in mind therefore, it is the primary object of the present invention to provide an optical signal-transmission system for an automotive vehicle which can optically transmit digital control signals generated from switches provided on the steering wheel to other control systems to control the vehicle operating conditions without producing electric noise, even when the steering wheel is freely turned.

To achieve the above-mentioned object, the optical signal transmission system of the present invention comprises an optical transmission device including a electricity-to-light converting means, a light-transmitting means, and a light-to-electricity converting means, in addition to a digital circuit configuration including an encoder, decoder etc., so that a number of control signals can be transferred optically from the switches on the steering wheel to the necessary controller to control the vehicle operating conditions, with a good reliability without electrical noise.

BRIEF DESCRIPTION OF THE DRAWINGS

The features and advantages of the optical signal-transmission system according to the present invention will be more clearly appreciated from the following description taken in conjunction with the accompanying drawings in which like reference numerals designate corresponding elements and in which:

FIG. 7 is a perspective view of the light emitting surface of a light-transmitting ring of a sixth embodiment of the present invention;

FIG. 8(a) is a cross sectional view of the light-transmitting ring of a seventh embodiment of the present invention;

FIG. 8(b) is a cross sectional view of the light-transmitting ring of an eighth embodiment of the present invention;

FIG. 8(c) is a cross sectional view of the light-transmitting ring of a ninth embodiment of the present invention;

FIG. 17 is a cross sectional view of an eighteenth embodiment of the present invention.

DETAILED DESCRIPTION OF THE PREFERRED EMBODIMENTS

To facilitate understanding of the present invention, a brief reference will be made to a prior-art mechanical signal-transmission system for an automatic vehicle which transfers electrical generated from switches on the steering wheel to other controllers to control the vehicle operating conditions.

Figure 1A:
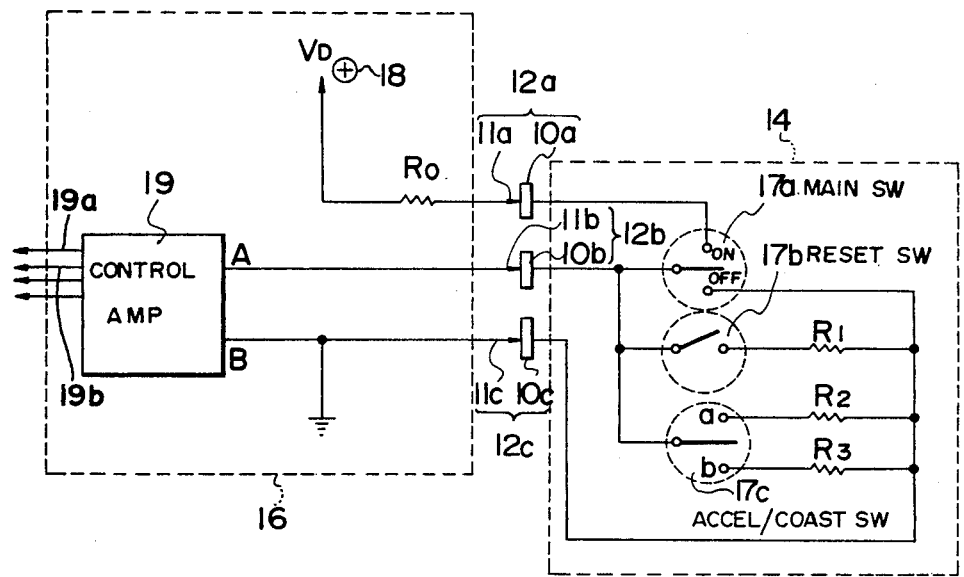
FIG. 1(a) is a block schematic diagram of an example prior-art automatic speed control device.
Figure 1B:
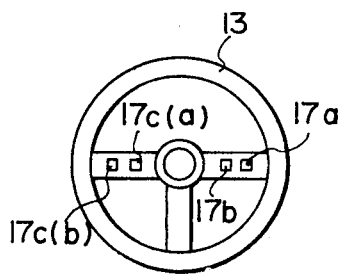
FIG. 1(b) is front and back views of the steering wheel used with the device of FIG. 1(a), and a perspective view of the steering post used therewith.
Figure 1C:
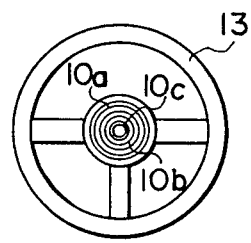
Figure 1D:
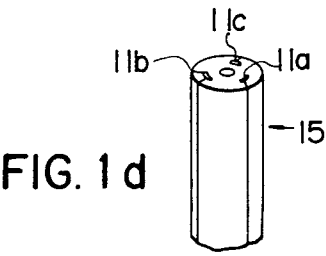

Referring to FIGS. 1(a), and (b), in which are shown an automatic speed cruise control device (ASCD) which is controlled from switches arranged on the steering wheel 13. The device is made up of an electronic controller, a vacuum pressure servo mechanism, etc. which maintains a given vehicle speed automatically, within a range of 50 to 100 km/h, without operating the accelerator. The device is further provided with a function such that the vehicle speed can be increased up to a desired speed (i.e. an accelerate function) and a temporarily deceleration can be reset to the original set speed (i.e. a resetting function). The device comprises a switch section 14 including a main switch 17a, a reset switch 17b, and an accelerate/coast switch 17c (COAST here means that the vehicle moves along without application of engine power), controller 16 including a control amplifier 19 provided around the steering post 15, and mechanical sliding switches 12a, 12b and 12c including slip rings 10a, 10b and 10c respectively attached to the steering wheel 13 of FIG. 1(b) and point contacts 11a, 11b and 11c respectively attached to the steering post 15 to connect the steering switches 14 to the controller 16 electrically.

In additiona, resistors $R_1$, $R_2$ and $R_3$ are provided within the switch section 14 to apply an appropriate voltage to the control amplifier 19 in response to one of the switches being depressed by the driver. A resistor $R_0$ is provided between the supply voltage 18 and the sliding switch 12a. The control amplifier 19 has output terminals 19a, 19b, . . . to apply appropriate control (command) signals to the respective actuators (not shown) after determining which steering switch is depressed based on the voltage across the input terminals A and B.

In the device described above, when either the reset switch 17b or the accelerate/coast switch 17c is depressed after the main switch 17a has been turned on, the following voltage $V_{AB}$ is developed across the terminals A and B (when the supply voltage 18 is $V_D$):

(1) if the reset switch is turned on;

$$V_{AB} = \frac{R_1}{R_0 + R_1} V_D$$

(2) if the accelerate/coast switch is set to contact a (COAST);

$$V_{AB} = \frac{R_2}{R_0 + R_2} V_D$$

(3) if the accelerate/coast switch is set to contact b (ACCELERATE);

$$V_{AB} = \frac{R_3}{R_0 + R_3} V_D$$

Therefore, since the control amplifier can detect the difference between the voltage potentials determined above it can output an appropriate control signal to the respective actuator (not shown9 in response to the input signal.

In this automatic speed control device, however, three mechanical sliding switches are required to connect the controller to the switches on the steering wheel. In addition, since another sliding switch to supply power to the horn switch is necessary, four sliding switches are needed in total. This sliding mechanism has shortcomings such as that it is impossible to increase the number of switches generating the control signals within such a small area on the steering wheel or to achieve more reliable switching function because of electrical noise caused by chattering of the contact points.

Figure 2:
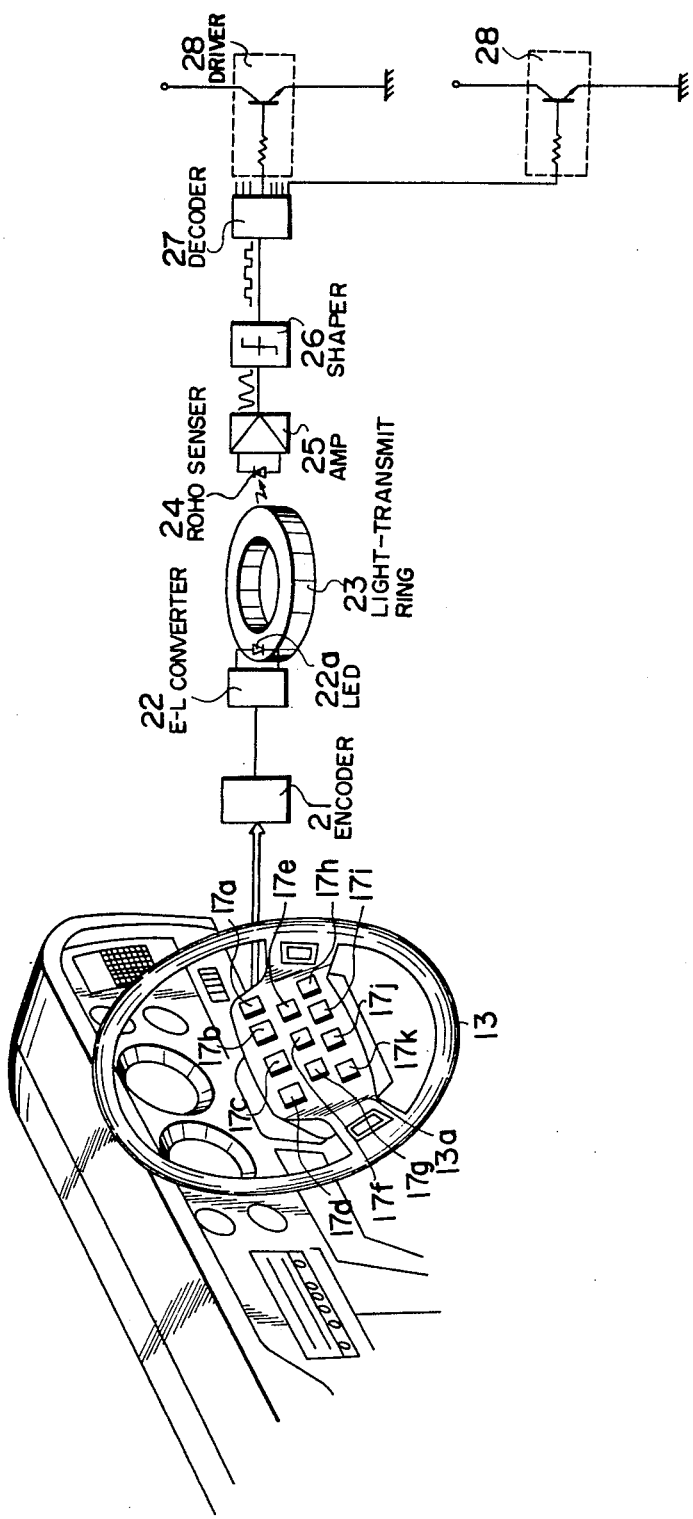
FIG. 2 is a basic block schematic diagram of the optical signal transmission system for an automotive vehicle according to the present invention.

In view of the above description, reference is now made to FIGS. 2 to 10, and more specifically to FIG. 2, wherein a block schematic diagram of a basic embodiment of the optical signal-transmission system of the present invention is illustrated.

In FIG. 2, the embodiment comprises eleven steering switches 17a, 17b, . . . , and 17k arranged on a switch board 13a on a steering wheel 13, an encoder 21 to output the corresponding pulse code signal in response to the information generated whenever one of the switches 17a, 17b, . . . , and 17k is depressed, an electricity-to-light converting means 22 to which the electric pulse code signal is inputted and from which the light signal is outputted through a light-emitting element 22a such as a light-emitting diode, a light-transmitting, ring 23 made of a material with a high light-transmittivity and a high tension-strength such as acrylic resin, U-polymer or polycarbonate, a light-to-electricity converting means 24 such as a photodiode using infrared radiation, to convert the optical signal emitted from the light-transmitting ring 23 into an electrical signal, an amplifier 25 to amplify the converted electrical signal to an appropriate level, a waveform shaper 26 to shape the amplified signal into a pulse signal after limiting the amplitude thereof to a constant level, a decoder 27 to decode the pulse code signal fed from the waveform shaper 26 to determine from which switch the signal information is outputted, and a driver 28 to drive the actuator to control the given controller in response to the drive signal outputted from the decoder 27.

The table listed below shows an instance of the relation between switch information (control signals or commands) and the corresponding codes of the eleven switches 17a, 17b, . . . and 17k arranged on the switch board 13a of the steering wheel 13.

| SWITCH | COMMAND | CODE |
| --- | --- | --- |
| 17a | RADIO On/OFF | 0001 |
| 17b | RADIO 1-ch | 0010 |
| 17c | RADIO 2-ch | 0011 |

| SWITCH | COMMAND | CODE |
| --- | --- | --- |
| 17d | RADIO 3-ch | 0100 |
| 17e | RADIO 4-ch | 0101 |
| 17f | RADIO 5-ch | 0110 |
| 17g | ILLUMINATION HIGH | 0111 |
| 17h | ILLUMINATION LOW | 1000 |
| 17i | AM/FM SELC. | 1001 |
| 17j | VOLUME UP | 1010 |
| 17k | VOLUME DOWN | 1011 |

In this embodiment, in order to output eleven control signals, eleven switches 17a, 17b, ... 17k are provided and a 4-bit information code is used to distinguish between signals; however, it is possible to output up to $2^n$ control signals by increasing the number n of bits.

Figure 3A:
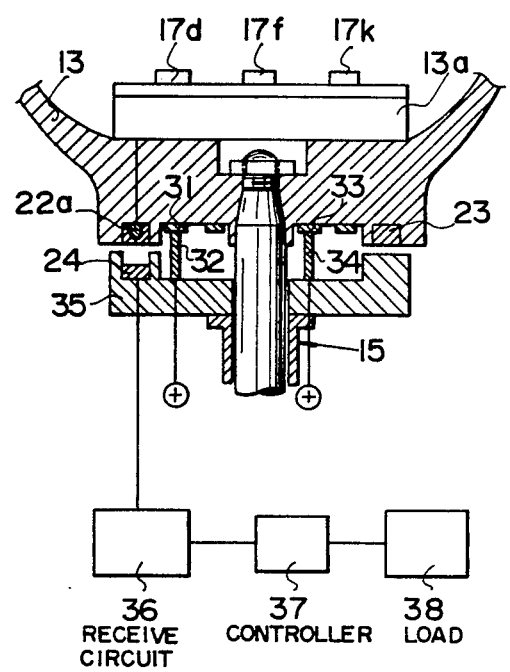
FIG. 3(a) is a sectional view of the steering wheel and the combination switch body with a schematic block diagram of a first embodiment of the optical signal transmission system for an automotive vehicle of the present invention.

FIGS. 3(a) and (b) show the steering wheel and the combination switch body of the first embodiment of the optical signal transmission system according to the present invention. This embodiment comprises the switches 17d, 17f and 17k (the other switches are not shown) provided on the switchboard 13a of the steering wheel 13, the encoder 21 (not seen) housed within the switch board 13a, the light emitting element 22a connected to the electricity-to-light converting means 22 (in FIG. 2), the light-transmitting ring 23 fixed behind the steering wheel 13 to receive the optical signal emitted from the light-emitting element 22a, a first contact made up of a slip ring 31 fixed to the steering wheel 13 and arranged concentrically with the light-transmitting ring 23 and a slip contact 32 fixed to a combination switch body 35 to apply power to the encoder 21, the second contact being made up of a slip ring 33 and a slip contact 34 arranged and fixed in the same manner as the first contact to apply power to the horn switch, the light-to-electricity converting means 24 arranged on the combination switch body 35 facing the base of the light-transmitting ring 23, a receiving circuit 36 connected to the light-receiving element 24, a controller 37 connected to the receiving circuit 36, and a load 38 such as an electronic amplifier or an automatic air conditioner which is to be operated by the controller 37. In this embodiment, the receiving circuit 36 comprises the amplifier 25 and the waveform shaper 26 shown in FIG. 2; the controller 37 comprises the decoder 27 and the driver 28.

The operation of the embodiment illustrated in FIG. 2 and FIGS. 3(a) and (b) will be described hereinbelow with reference to FIG. 4.

Figure 4:
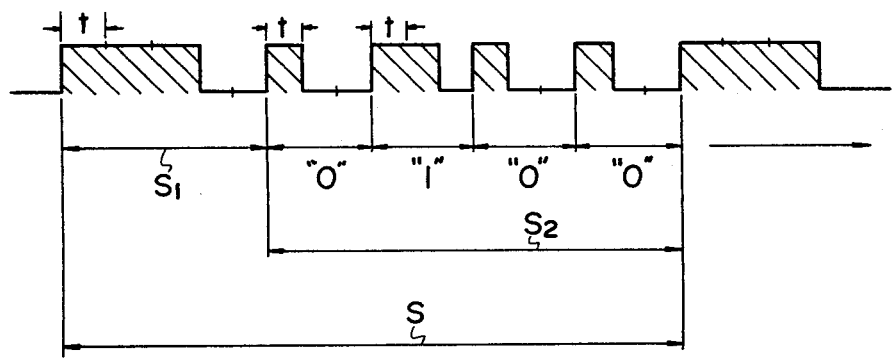
FIG. 4 is an example of a pulse transmission code used with the optical transmission system of the pesent invention.
Figure 5:
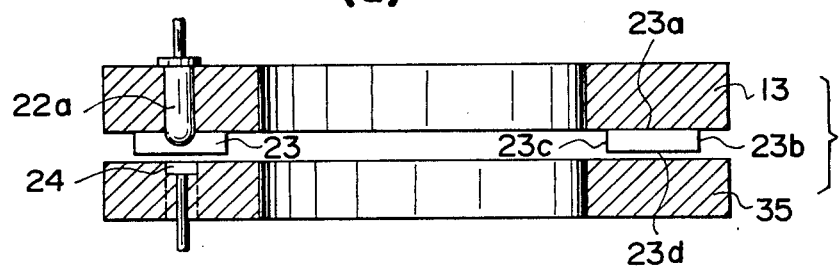
FIG. 5(a) shows a cross sectional view of the light-transmitting ring of a second embodiment of the present invention.
FIG. 5(b) is a perspective view, partly in section, of the second embodiment of FIG. 5(a)
Figure 5:
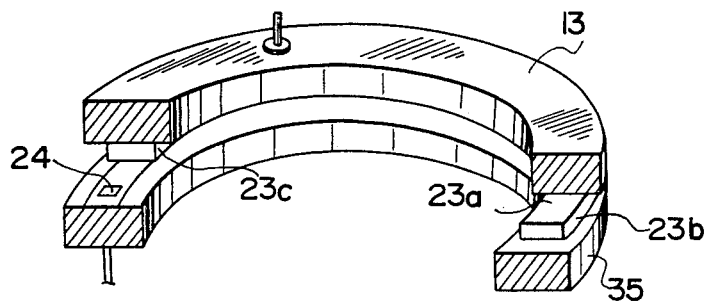
Figure 6:
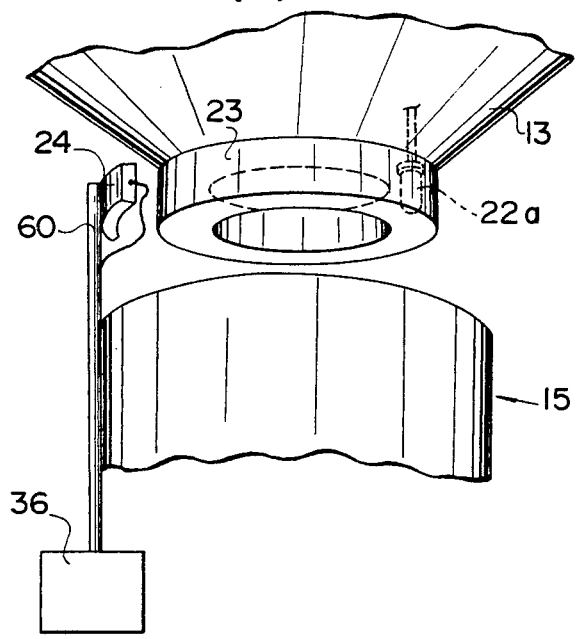
FIG. 6(a) is a perspective view of the light receiving element of a third embodiment of the present invention.
FIG. 6(b) is a cross sectional view of the light-transmitting groove of a fourth embodiment of the present invention.
Figure 6:
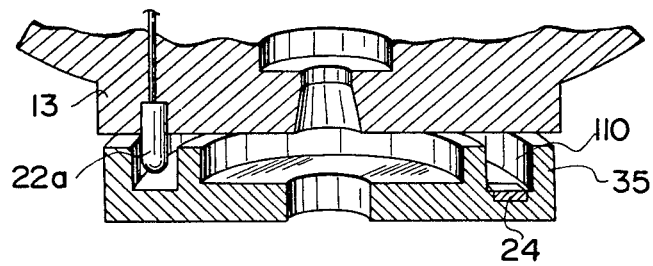
Figure 9:
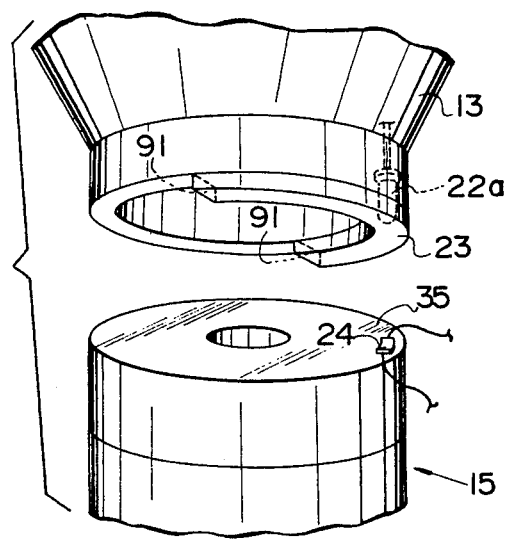
FIG. 9(a) is a perspective view of the light-transmitting ring of a tenth embodiment of the present invention, indicating the relative position of the steering wheel and the combination switch body when the steering wheel is in its rest position.
FIG. 9(b) is the same view as in FIG. 9(a) when the steering wheel has been turned through 180 degrees.
Figure 9:
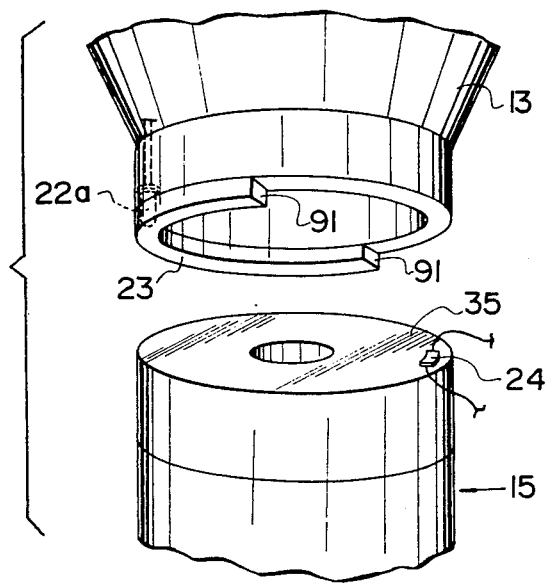
Figure 10:
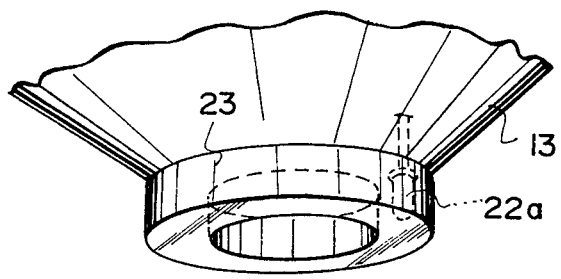
FIG. 10(a) is a perspective view of the ordinary light-transmitting ring of the present invention.
FIG. 10(b) is a cross sectional view thereof.
Figure 10:
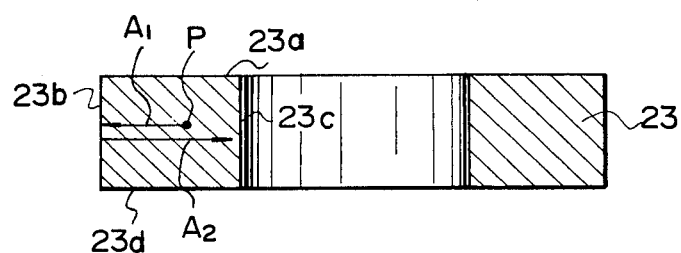

When switch 17d is depressed to select the 3rd channel of the radio for instance, the switch information is inputted to the encoder 21, and the transmission code S as shown in FIG. 4 is outputted therefrom. The transmission code S includes a start signal S₁ and the information code train S₂ listed in the table already described hereinabove. The start signal S₁ has a high potential level with a pulse width of 3t and a low potential level of width 2t; the infromation code train S₂ represents "0" by a pulse of t and "1" by a pulse of 2t. Therefor, the encoder 21 detects the operation of the steering switch 17d and outputs a transmission code S including the code trais S₂ of "0", "1", "0", and "0". The transmission code S is next converted into a light signal through the light-emitting element 22a. The converted light signal propagates through the light-transmitting ring 23 and reflects from the walls thereof, the light-receiving element 24 receives the optical signal from the light-transmitting ring 23 irrespective of the position of the steering wheel and outputs an electric signal in response to the optical signal received. This electric signal is applied to the waveform shaper 26 in order to cut the potential level at a predetermined level after being amplified through the amplifier 25, and is outputted as the original pulse coded signal. This pulse signal is decoded in the decder 27, and is outputted as a control signal to one of the drivers 28 so that the 3rd channel of the radio is selected when switch 17d is depressed. Since the control signal is applied to the base of the driver 28 to turn on the transistor, the channel could be selected by dropping the potential of the switch signal input terminal of an electronic tuner to the ground level.

To improve reliability in addition, the period of the transmission code S shown in FIG. 4 can be determined to be 50 msec in order to transmit the same code S twice per depression of the switch (because the period during which the switch is depressed is likely to be more than 100 msec). Therefore, the unit pulse width t is 2.78 msec (50 msec/18 bits), and a pulse with a frequency of 180 Hz and with a duty factor of 50 percent must be transmitted therethrough. In this embodiment, since a light-emitting diode and a photo-transistor are used for the light-emitting element and the light-receiving element respectively, it is possible to provide a transmission rate of more than 1 M bit/sec. Further, when the vehicle battery is used to power the encoder, it is desirable to put a constant voltage regulator thereinto to prevent voltage fluctuations or variations. Furthermore, it is desirable to arrange the photosensor 24, amplifier 25, and waveform shaper 26 as near as possible to each other to prevent the S/N ratio from being lowered.

FIGS. 5(a) and (b) shown the second embodiment, which comprises the light-transmitting ring 23 provided on the stering wheel 13, the light-emitting element 22a to supply an optical signal to the light-transmitting ring 23, and the light-receiving element 24 provided on the combination switch body 35. In this embodiment, in order to increase the amount of light outputted from the light-emitting surface 23d of the light-transmitting ring 23, a highly reflective paint, plating or vacuum deposition film (made of silver or aluminium) is applied to the other three surfaces 23a, 23b, and 23c thereof.

FIG. 6(a) shows the third embodiment, which comprises the steering wheel 13, the light-emitting element 22a, the light-transmitting ring 23 attached to the back of the steering wheel 13 and provided with the implanted light-emitting element 22a, the light-receiving element 24 arranged on the side of the light-transmitting ring 23, a supporting member 60 to support the light-receiving element 24, and the receiving circuit 36 connected to the light-receiving element 24 (photosensor).

In this embodiment, since a relatively large amount of light is transmitted from the outer side of te light-transmitting ring 23, compared to that transmitted from the other sides, in view of its shape, it is possible for the light-receiving element 24 to receive a large amount of light, thus improving the transmission characteristics.

FIG. 6(b) shows the fourth embodiment, where a ring-shaped groove 110 is formed in the combination switch body 35 to provide a light-transmitting means without using a light-transmitting ring. The light-emitting element 22a is fixed to the steering wheel 13 so that the light-emitting portion is positioned in the groove 110, and the light receiving element 24 is disposed on the bottom of the groove 110. The light emitted from the light-emitting element travels around the groove circumference by reflection from the groove walls to the light-receiving element 24. To increase the light transmittivity, it is desirable to apply a highly reflective paint, silver plating or aluminium vacuum deposition film to the inner surface of the groove 110.

Figure 3B:
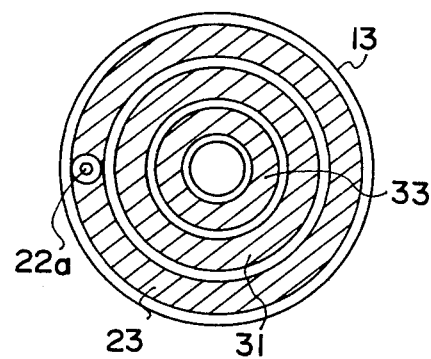
FIG. 3(b) is a back view of the steering wheel and a top view of the combination switch body used with the first embodiment of FIG. 3(a)
Figure 3C:
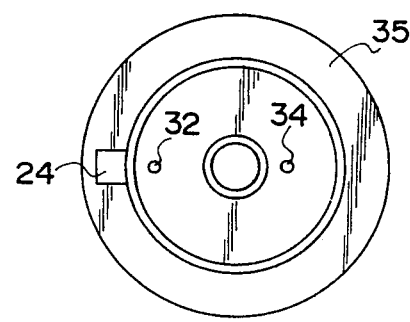

In addition, although not shown in detail in FIG. 6(b), this embodiment operates in the same manner as the one shown in FIG. 3 except that the combination switch body 35 is made of a material with a high light-transmittivity, the light-receiving element is implanted in the switch body 35, and the light-transmitting groove 110 is fixed to the steering post side.

FIG. 7 shows the fifth embodiment of the light-transmitting ring, by which it is possible to increase the level of the optical signal emitted from the ligh-emitting surface thereof. Usually when the angle of incidence of a ray of light 70 exceeds the critical angle within a material for instance 42° in acrylic resin, the light 70 reflects back from the surface into the material. To overcome this problem, in this embodiment, the light-emitting surface 23d is roughened by sandpaper; therefore, most of the incident light is diffused, regardless of its angle of incidence from the roughened surface 23d of the llight-transmitting ring 23, thus increasing the amount of incident light applied to the light-receiving element 24. Further, in this embodiment, it is desirable to use a light-emitting element with a wider directivity and a greater brightness. In the case where a narrow directivity light-emitting element is used, the greater the thickness of the light-transmitting ring, the greater the amount of light received. In addition, in order to obtain a sufficient amount of light around the whole cicumference of the light-transmitting ring, it is possible to dispose a plurality of light-transmitting elements at the symmetrical positions, for example, at two positions facing each other (i.e. with an angular interval of 180°).

FIGS. 8(a), (b) and (c) show the sixth embodiment of the light-transmitting ring 23 by which the optical signal emitted from the light-emitting element 22a is transmitted efficiently within the ring 23. In FIG. 8(a), a depression 80 of conical shape (the cut angle is $\theta$) is provided on the surface of the light-transmitting ring 23, and the light-emitting element 22a is disposed within the depression. In FIG. 8(b), a cutout 80 of conical shape (the cut angle is again $\theta$) is provided on the opposite surface of the light-transmitting ring 23, and the light-emitting element 22a is disposed facing depression. In this embodiment, if the thickness of the ring 23 is $t_1$, the light-emitting element 22a is disposed near the base thereof and the light emitted therefrom is allowed to shine from the outside of the element, and if the thickness is $t_2$, the light-emitting element 22a is embedded within the ring 23. In FIG. 8(c), a depression 80 of hemispherical shape is provided in the light-emitting ring 23. In this embodiment, it is possible to dispose the light-emitting element 22a in the same manner as described for FIG. 8(b).

In these embodiments, since the light emitted from the light-emitting element 22a strikes the surface at an angle of reflection of $\theta$, and since the light reflects from the wall of the ring without being transmitted through the wall of the light-transmitting ring 23, it is possible to increase amount of the light which transmits through the light-transmitting ring 23, thus allowing the detection of a relatively uniform optical signal even at a position far away from the light-emitting element 22a.

In the embodiments shown in FIGS. 8(a) and (b), it is desirable to design the depression angle $\theta$ to be less than the critical angle because the light emitted from the light-emitting element cannot travel into the light-transmitting ring 23 through the depression's surfaces when the angle $\theta$ exceeds the critical angle.

FIGS. 9(a) and (b) show the seventh embodiment. This embodiment comprises the steering wheel 13, the light-emitting element 22a, a semicircular ring shaped light-transmitting ring 23, and the light-receiving element 24 mounted on the combination switch body 35. FIG. 9(a) shows the condition when the steering wheel is in its rest position; FIG. 9(b) shows that when the steering wheel has been turned through 180 degrees from the position shown in FIG. 9(a).

In this embodiment, when the steering wheel is turned more than 90 degrees clockwise or counterclockwise from the rest position of FIG. 9(a), since the light-receiving element 24 is positioned away from the light-transmitting ring 23, the light-receiving element 24 detects no light signals. This embodiment has the advantage such that it is possible to neglect any erroneous operation of the switches, for example when the switches are depressed by mistake while the steering wheel is turned to drive the vehicle round a curve into a garage. In addition, in this embodiment, it is further desirable to apply dark paint to both end surfaces 91 of the light-transmitting ring 23 to prevent light from being emitted therefrom.

As described above, according to the optical signal-transmission system for an automotive vehicle of the present invention, since the control signals generated from switches provided on the steering wheel are applied to the necessary control system through light-transmitting devices, it is possible to increase the number of control signals generated from the switches without using sliding contact mechanisms, to reduce electrical noise, to improve reliability, and to ensure relatively simple construction.

FIGS. 10(a) and (b) show an ordinary light-transmitting ring 23 already described hereinabove for an explanation of the shortcomings thereof, and FIGS. 11(a), (b), (c) and (d) show the eighth embodiment of the present invention.

In FIGS. 10(a) and (b), since the cross section of the ring 23 is square, the light emitted from the light-emitting element 22a travels radially within the ring repeatedly reflecting from the inner and outer vertical circumferential surfaces. For instance, the light signal (the arrow $A_1$) travelling from a point P to the outer circumferential surface 23b reflects therefrom and travels toward the inner circumferential surface 23c (the arrow $A_2$). Therefore, the light will attenuate within the ring when repeatedly travelling and reflecting therewithin before reaching the light-receiving element positioned near the bottom 23d of the ring 23.

This results in an increase in transmission loss and requires the provision of a large capacity light-emitting element to overcome this loss. However, it is very difficult to pass a large current through the slip rings from the standpoint of the consequent increase in temerature. On the other hand, an increase in light-receiving performance of the light-receiving element may inevitably require a highly sensitive photosensor, thus increasing the cost. Further, it is not desirable to increase the amplification ratio of the amplifier, since noise will be amplified at the same time and thereby the S/N ratio will be lowered.

FIGS. 11(a), (b), (c) and (d) show the eighth embodiment of the present invention. This embodiment comprises the steering wheel 13, a light-transmitting ring 23 having a mirror-finished top surface 23a, inner and outer circumferential surfaces 23b and 23c, and a bottom surface 23d from which the light is detected, a light-emitting element 22a which transmits an optical signal to the light-transmitting ring 23, and a light-receiving element 24 which receives an optical signal transmitted from the bottom 23d of the ring 23. As shown in FIG. 11(b), the light-transmitting ring is formed in the shape of a frustum of a cone with an outer circumferential tapered surface of angle δ.

In this embodiment, the optical signal emitted from the light-emitting element 22a travels within the light-transmitting ring 23, and the light-receiving element 24 receives the optical signal transmitted from the bottom surface 23d of the ring 23. The light-receiving element 24 outputs the received optical signal to the next stage controller (not shown) to control the vehicle operating conditions. Even when the optical signal within the light-transmitting ring 23 travels from the point P to the outer circumferential surface 23b (see the arrow $A_1$), since the surface 23b is tapered, the optical signal is emitted from the bottom 23d (the light-emitting surface) after reflection from the tapered surface 23b, as depicted by the arrow $A_2$ in FIG. 11(b). Therefore, the light does not attenuate much within the light-transmitting ring 23, and thus it is possible to increase the amount of light emitted from the bottom 23d thereof.

Figure 11:
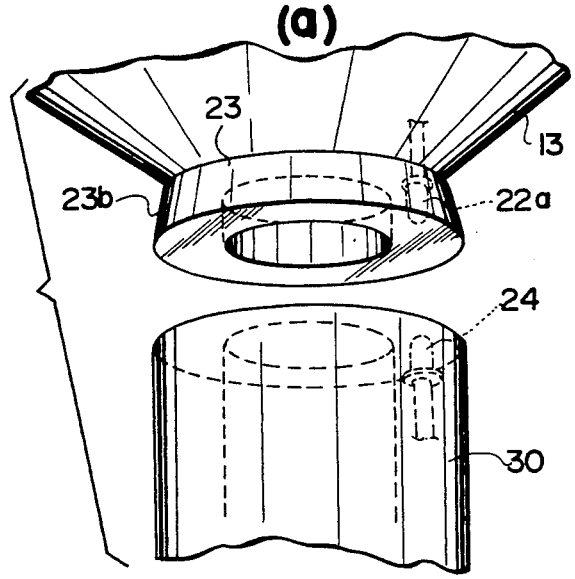
FIG. 11(a) is a perspective view of the light-transmitting ring of an eleventh emodiment of the present invention.
FIG. 11(b) is a cross sectional view of the light-transmitting ring of the embodiment of FIG. 11(a)
FIG. 11(c) is a cross sectional view of the light-transmitting ring of a twelfth embodiment of the present invention.
FIG. 11(d) is a cross sectional view of the light-transmitting ring of a thirteenth embodiment of the present invention.
Figure 11B:
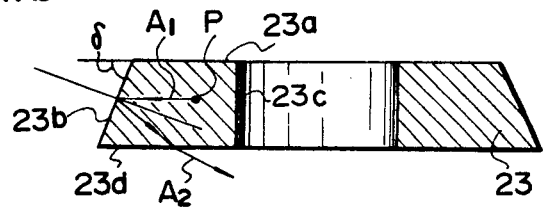
Figure 11C:
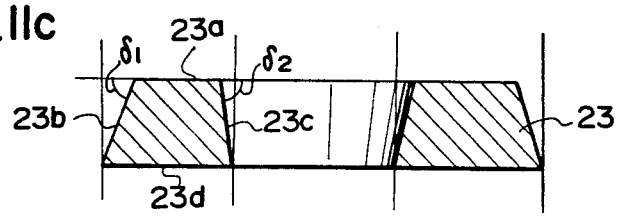

FIG. 11(c) shows a light-transmitting ring formed in the shape of a frustum of a cone with a tapered center hole, the outer and inner circumferential tapered surfaces of which have angles of $\delta_1$ and $\delta_2$, respectively.

Figure 11D:
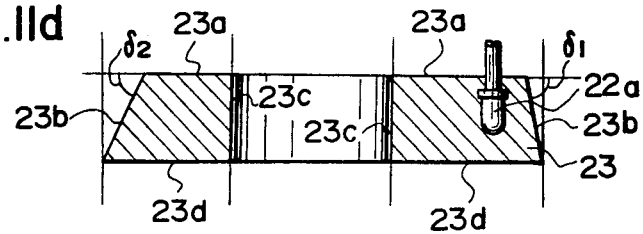

FIG. 11(d) shows a light-transmitting ring formed in the shape of a frustum of a non-right cone. In this case, the maximum taper angle of $\delta_1$ is provided on the outer circumferential position near the light-emitting diode 22a and the minimum taper angle of $\delta_2$ is provided on the outer circumferential position opposite to that of $\delta_1$, allowing the taper angle thereof to decrease gradually from $\delta_1$ to $\delta_2$.

In the case of (c), an additional taper angle of $\delta_2$ of the central hole can further increase the proportion of the light emitted from the bottom surface 23d as compared with the case of (b).

In the case of (d), the farther away from the light-emitting element 22a, the less the taper angle and therefore the more the light is emitted from the bottom; that is to say, this construction allows the light-receiving element to receive a more uniform optical output signal through the bottom of the light-transmitting ring 23.

Figure 12:
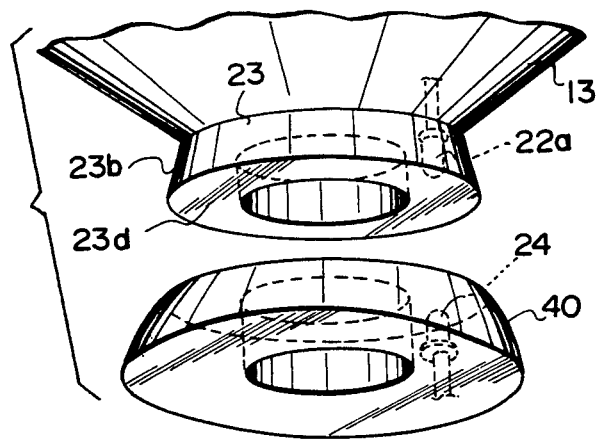
FIG. 12(a) is a perspective view of the light-transmitting ring and the light-receiving ring of a fourteenth embodiment of the present invention.
FIG. 12(b) is an enlarged cross-sectional view of the embodiment of FIG. 12(a)
Figure 12:
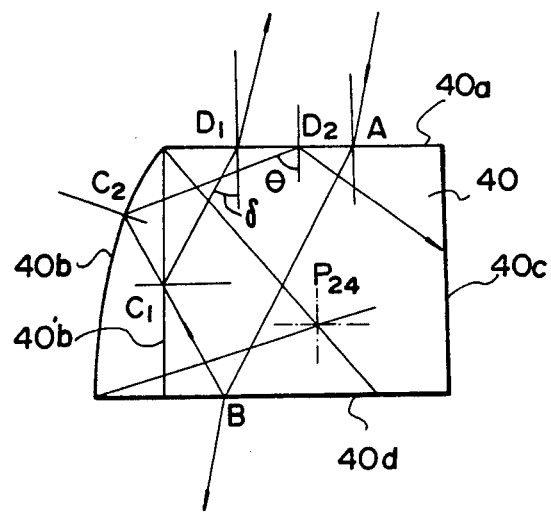

In the embodiments described in FIGS. 11, it is of course possible to obtain the same effect by having the tapered surface formed by a circular arc but not by a straight line, as is shown in FIG. 12(a).

FIGS. 12(a) and (b) show the ninth embodiment, which comprises the steering wheel 13, the light-transmitting ring 23 fixed to the wheel 13 and having a tapered circumferential surface 23b and a light-emitting surface 23d, the light-emitting element 22a implanted in the light-transmitting ring 23 to output an optical signal, a light-receiving ring 40 fixed to a steering post (not shown) to detect the optical signal, and the light-receiving element 24 implanted in the light-receiving ring 40. The light-receiving ring 40, as shown in FIG. 12(b), has a top surface 40a to which the optical signal is applied, outer and inner circumferential surfaces 40b and 40c, and a bottom surface 40d, the outer circumference 40b being formed of a circular arc described with the position of the light-receiving element 24 as the center P24.

It is also possible to provide another curve on the inner circumference 40c if necessary.

In the construction described above, referring to FIG. 12(a), the optical signal emitted from the light-emitting element 22a travels within the light-transmitting ring 23, goes out from the bottom surface thereof 23d, and falls on the top surface 40a of the light-receiving ring 40. The light-travelling within the light-receiving ring 40 is detected by the light-receiving element 24 and is inputted to the next stage controller (not shown) after conversion into an electric signal. In this embodiment, since the light-receiving ring 40 has a curved outer surface 40b, the light-falling onto point A, for instance, reflects from points B and $C_2$. Although the optical signal reflected from point $C_2$ again reaches top surface 40a at $D_2$, since the angle of incidence $\theta$ is so designed as to be larger than the critical angle of the material of the ring 40, the light reflects again from point $D_2$ returning back within the ring 40, thus decreasing the transmission loss. In the case where the surface 40b is not curved but is straight as is shown by the line 40'b in FIG. 12(b), the optical signal incident upon the top surface 40a travels along the path $A \rightarrow B \rightarrow C_1 \rightarrow D_1$. In this case, since the angle of incidence δ of the light ray at the point $D_1$ is less than the critical angle, the light is not reflected back into the light-receiving ring and transmission loss increases.

Concerning this problem, the critical angle of a light-transmitting or receiving ring made of acrylic resin (e.g. methyl methacrylate) is 42°10' and the critical angle $\theta_x$ of other materials can be obtained by an expression: $\sin\theta_x = 1/n$ (where n is refractive index). The following table lists refractive indexes of various materials that can be used for the light-transmitting or receiving rings.

| MATERIAL | n |
| --- | --- |
| GLASS | |
| Germanium glass | 1.82 |
| Aluminum potassium glass | 1.65 |
| Borosilicate crown glass | 1.51 |
| Barium crown glass | 1.56 |
| Flint glass | 1.60 |
| OPTICAL FIBER | |
| Acrylic plastic, Styrol | 1.59 |
| Acrylic plastic, Methacrylic resin | 1.49 |
| Methyl methacrylate | 1.491 |
| Cyclohexile methacrylate | 1.50 |
| Styrene | 1.59 |
| Allylic carbonate | 1.50 |

As described above, referring to a light-transmitting ring used with the optical signal transmission system of the present invention, since a tapered surface is formed for the inner and/or outer circumferential surfaces of the light-transmitting or receiving rings to increase the intensity of the optical signal emitted from the light-emitting surface, it is possible to reduce transmission losses in the light-transmitting or receiving rings used with the optical signal transmission system of the present invention.

Figure 13:
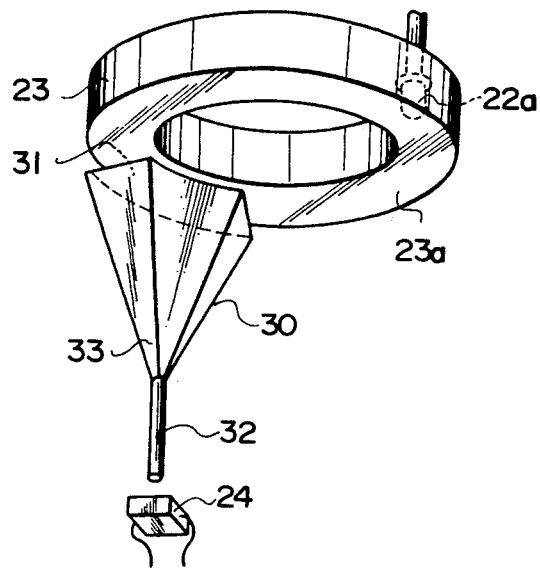
FIG. 13 is a perspective view of the light collector of a fifteenth embodiment of the present invention.

FIG. 13(a) shows the tenth embodiment. This embodiment comprises the light-emitting element 22a to convert a pulse code signal outputted from the encoder in accordance with any of switches into an optical signal, the light-transmitting ring 23 to receive and transmit the optical signal emitted from the element 22a and to emit the signal from the light-emitting surface 23a, a light collector 30 to collect the optical signal emitted from the light-emitting surface 23a of the light-transmitting ring 23, and the light-receiving element 24 to receive and convert the optical signal from the light collector 30 into an electric signal. Being made of a material with a high refraction index such as those shown in the table already listed hereinabove, the light collector 30 has a wide light receiving surface 31 facing the light-emitting surface 23a of the light-transmitting ring 23, a collected light-emitting portion 32 to transmit the optical signal received through the light-receiving surface 31 to the light-receiving element 24, and a light-collecting portion 33 to collect the optical signal received through the light receiving surface 31 to the light-collecting portion 33.

In the construction described above, when an optical signal is outputted from the light-emitting element 22a, the light-transmitting ring 23 receives the optical signal. The optical signal travelling therewithin is emitted from the light-emitting surface 23a, received through the light-receiving surface 31 of the light collector 30, and through the light-emitting portion 32 after collection by the light-collecting portion 33. The light-receiving element 24 receives the optical signal emitted from the light-emitting portion 32 of the light collector 30 and converts it into an electric signal to control the vehicle operating conditions through the appropriate controller.

In the embodiment thus constructed, since the light-receiving surface 31 of the collector 30 has a wide light-receiving area, it is possible to obtain a higher light intensity, thus eliminating the undesirable external factors due to for instance noise, without increasing the cost of the light-receiving element. Further, in this embodiment, it is possible to design the light-collector 30 so as to have a wide light-receiving surface 31 covering substantially the whole light-emitting surface 23a of the light-transmitting ring 23.

Figure 14:
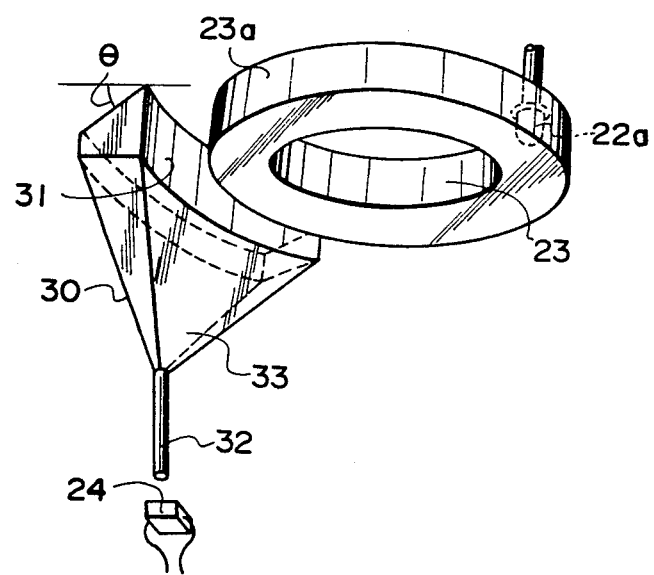
FIG. 14 is a perspective view of the light collector of a sixteenth embodiment of the present invention.

FIG. 14 shows the eleventh embodiment. Compared with that shown in FIG. 13, in this embodiment the light emitting surface 23a of the light-transmit ring 23 is changed from the bottom to the outer circumferential surface, and the light-receiving surface 31 of the light collector 30 is positioned facing the outer light-emitting surface 23a of the light-transmitting ring 23. The back of the light-receiving surface 31 of the light collector 31 is positioned at an angle of 45° ($\theta$ in FIG. 14) to the light-receiving surface 31 so as to reflect the optical signal received by the light-receiving surface 31 to the light-collecting portion 33.

Figure 15:
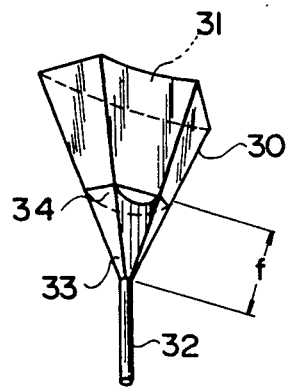
FIG. 15 is a perspective view of the light collector of a seventeenth embodiment of the present invention.

FIG. 15 shows the twelfth embodiment. In this embodiment, a convex lens 34 made of a material whose refractive index is greater than that of the light collector 30 is positioned within the collector 30 at a position approximately the focal distance away from the light-collecting portion 33, so that it is possible to collect the optical signal effectively at the light outputting portion 32. It is also possible to obtain the same result by placing a Fresnel lens in place of the light-receiving surface 31 of the light collector 30.

Figure 16:
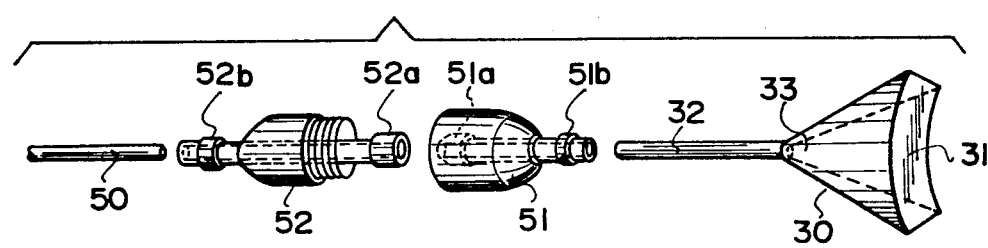
FIG. 16 is a perspective view of the light collector of the seventeenth embodiment of FIG. 15, where an optical fiber cable is connected thereto through a pair of connectors.

FIG. 16 shows the thirteenth embodiment. In this embodiment, an optical fiber 50 is connected to the light-outputting portion 32 of the light collector 30 by using a pair of fiber connectors 51 and 52 having a pair of pipe fixing portions 51b and 52b. That is to say, the light outputting portion 32 of the light collector 30 is fitted to the connector 51 by the pipe fixing portion 51b; the optical fiber is fitted to the connector 52 by the pipe fixing portion 52b; the connector pipe fitting portions 51a and 52a are fixed to each other after alignment of the two optical axes by the use of the screw thread on the respective connectors.

The other end of the optical fiber 50 is, of course, connected to the light-receiving element, where the optical signal is converted into an electric signal. In this embodiment, it is possible to extend the light outputting portion 32 to the necessary position by the use of an optical fiber and a pair of fiber connectors.

In these embodiments, according to the present invention, it is possible to transmit optical signals to controllers positioned at some convenient place with a higher signal to noise ratio without interference caused by external factors.

In addition, as the material for the light collector it is possible to use the same material, for the light-transmitting and receiving rings whose refractive indexes have already listed hereinabove.

As described above, according to the optical signal-transmission device of the present invention, since the optical signal emitted from the light-transmitting ring is collected by the use of the light collector with a wide light-receiving surface, it is possible to transmit a large amount of light to the light-receiving element, without raising a number of problems such as:

(1) An optical signal is susceptible to noise;
(2) The controller should be placed near the optical signal transmitting device when the signal is small;
(3) An optical fiber is not suitable when the signal is small;
(4) A high sensitive light-receiving element is necessary when the signal is small, which would be expensive; and
(5) The signal to noise ratio becomes lower when the signal is small; therefore it is not sufficient to use an amplifier with a higher amplification degree.

FIG. 17 shows the fourteenth embodiment of the present invention. The embodiment comprises the steering wheel 13, the steering post 15, the light-emitting element 22a, the light-receiving element 24, a first light-transmitting sliding ring 101 fixed to the steering wheel 13, the combination switch body 35, a second light-transmitting sliding ring 102 fixed to the body 35, two slip rings 31 and 33 supported by the sliding ring 101, and two sliding contacts 32 and 34 supported by the slide ring 102. The first and second light-transmitting sliding rings 101 and 102 have a common sliding surface 103. A light-transmitting passage is formed between the light-emitting element 22a and the light-receiving element 24 through the sliding surface 103 or through the two surfaces 105 and 106 disposed near to and facing each other.

In this embodiment, since a light-transmitting passage is formed by the sliding rings 101 and 102, it is not necessary to provide a separate light-transmitting ring, and therefore it is possible to make the device smaller. Further, since a sliding surface 103 is provided between the sliding rings 101 and 102, it is possible to protect the device from being stained by dust or grease.

As described above, the optical signal transmission system for an automotive vehicle according to the present invention can effectively transfer a number of electric control signals generated from switches arranged on the steering wheel to the necessary controllers positioned away from the steering wheel, optically under a high reliability, without producing any electrical noise even while the steering wheel is being turned by the driver.

What is claimed is:

1. An optical signal transmission system for an automotove vehicle having a steering wheel, a steering wheel post, and a plurality of electrical loads, which comprises:
   (a) a plurality of switches arranged on the steering wheel to produce control signals;
   (b) an encoder provided on the steering wheel and connected to each of said switches for outputting a separate pulse code signal in response to each one of the control signals generated from said switches;
   (c) electricity-to-light converting means comprising a single light producing element for converting each pulse code signal from said encoder into an optical signal;
   (d) light-transmitting ring made of a solid material with a high light-transmittivity and positioned between the steering wheel and the steering post, receiving the optical signal emitted from said electricity-to-light converting means, and transmitting the optical signal throughout said light-transmitting ring;
   (e) light-to-electricity converting means comprising a single light receiving element for converting the optical signal transmitted throughout said light-transmitting ring into an electrical signal; and
   (f) a decoder for decoding the electric signal converted by said light-to-electricity converting means to output an electrical signal corresponding to one of said control signals to control any of the electric load required in the automotive vehicle,
   whereby a plurality of control signals are transmitted from the steering wheel to the steering post via said electricity-to-light converting means and said light-to-electricity converting means.

2. An optical signal transmission system for an automotive vehicle as set forth in claim 1, wherein said light-transmitting ring is fixed to the steering wheel, said electricity-to-light converting means being implanted within said light-emitting ring, said light-to-electricity converting means being fixed to the steering post and facing said light-transmitting ring.

3. An optical signal transmission system for an automotive vehicle as set forth in claim 1, wherein said light-transmitting ring is fixed to the steering wheel, said electricity-to-light converting means being implanted within said light-transmitting ring, said light-to-electricity converting means being fixed to the steering post and facing the circumferential surface of said light-transmitting ring.

4. An optical signal transmission system for an automotive vehicle as set forth in claim 1, wherein said ring-shaped light-transmitting means is formed in the shape of an arc so that no optical signal is transmitted therethrough after the steering wheel has been turned through more than a predetermined angle, whereby it is possible to prevent the erroneous operation of said steering switches when the steering wheel has been turned through a predetermined angle.

5. In optical signal transmission system for an automotive vehicle as set forth in claim 1, wherein said light-transmitting ring has a rough surface to which said light-to-electricity converting means is attached to increase the amount of light reflected therefrom.

6. An optical signal transmission system for an automotive vehicle as set forth in claim 1, wherein a highly reflective paint is applied to the surfaces of said light-transmitting ring other than the light-emitting surface.

7. An optical signal transmission system for an automotive vehicle as set forth in claim 1, wherein a highly reflective vacuum deposition metal film is applied to the surfaces of said light-transmitting ring other than the light-emitting surface.

8. An optical signal transmission system for an automotive vehicle as set forth in claim 1, wherein said light transmitting ring has a first flat surface and a second flat surface, the light-emitting surface of said electricity-to-light converting means being mounted on the first flat surface and a depression being formed on the second flat surface of said light-transmitting ring, facing the light-emitting surface of said electricity-to-light converting means.

9. An optical signal transmission apparatus for an automotive vehicle as set forth in claim 8, wherein said depression is formed in contact with the light-emitting surface of said electricity-to-light converting means.

10. An optical signal transmission system for an automotive vehicle as set forth in claim 8, wherein said light transmitting ring has a second flat surface opposite said first flat surface and said electricity-to-light converting means is placed on said second flat surface, wherein depression is hemispherical.

11. An optical signal transmission system for an automotive vehicle as set forth in claim 1, wherein said light-transmitting ring is a frustum of a right cone with a straight center hole, the bottom surface thereof being a light-emitting surface.

12. An optical signal transmission system for an automotive vehicle as set forth in claim 1, wherein said light-transmitting ring is a frustum of a right cone with a tapered center hole.

13. An optical signal transmission system for an automotive vehicle as set forth in claim 1, wherein said light-emitting ring is a frustum of a non-right cone with a center hole.

14. An optical signal transmission system for an automotive vehicle as set forth in claim 1, which further comprises a light-receiving ring in which said light-to-electricity converting means is implanted, said light-receiving ring being positioned facing said light-transmitting ring in the axial direction thereof.

15. An optical signal transmission system for an automotive vehicle as set forth in claim 10, wherein said light-receiving ring is a frustum of a right cone with a curved tapered circumferential surface, the curved surface thereof being formed with the position of said electricity-to-light converting means as its center.

16. An optical signal transmission system for an automotive vehicle as set forth in claim 1, which further comprises a light collector.

17. An optical signal transmission system for an automotive vehicle as set forth in claim 16, wherein said light collector is positioned facing the bottom light-emitting surface of said light-transmitting ring.

18. An optical signal transmission system for an automotive vehicle as set forth in claim 16, wherein said light collector is positioned facing the side circumferential surface of said light-transmitting ring.

19. An optical signal transmission system for an automotive vehicle as set forth in claim 16, wherein a convex ring is provided within said light collector at a position approximately the focal distance away from the light-collecting portion.

20. An optical signal transmission system for an automotive vehicle as set forth in claim 16, wherein a Fresnel lens is provided in place of the light-receiving surface of said light collector.

21. An optical signal transmission system for an automotive vehicle as set forth in claim 16, which further comprises an optical fiber cable connected to said light collector, whereby an optical signal is transferred to a place away from the position at which said light collector is placed.

22. An optical signal transmission system for an automotive vehicle as set forth in claim 21, which further comprises a pair of connectors having a pair of pipe fixing portions to extend the length of said optical fiber cable.

23. An optical signal transmission system for an automotive vehicle as set forth in claim 14, wherein
   (a) said light-transmitting ring is a first sliding ring made of a light-transmitting material which is fixed on the steering wheel side, said electricity-to-light converting means being implanted therewithin,
   (b) said light-receiving ring is a second sliding ring made of a light-transmitting material which is fixed on the steering post side, said light-to-electricity converting means being implanted therewithin,
   said second sliding ring having an inner circumferential surface in slidable contact with the outer circumferential surface of a collar of said first sliding ring, 24. An optical signal transmission system for an automotive vehicle as set forth in claim 23, which further comprises
   (a) a first slip ring fixed on the steering wheel:
   (b) a second slip ring fixed on the steering wheel;
   (c) a first slip contact fixed on the steering post,
   (d) a second slip contact fixed on the steering post, whereby power is applied to the switches therethrough.

25. An optical signal transmission system for an automotive vehicle as set forth in claim 1, wherein said electricity-to-light converting means is a light-emitting diode.

26. An optical signal transmission system for an automatic vehicle as set forth in claim 1, wherein said light-to-electricity converting means is a photodiode.

27. An optical signal transmission system for an automotive vehicle as set forth in claim 11 wheein said depression is conical.

28. An optical signal transmission system for an automotive vehicle as set forth in claim 8, wherein the depression is hemispherical.

29. An optical signal transmission system for an automotive vehicle having a steering wheel, a steering wheel post, and a plurality of electrical loads, which comprises:
   (a) a plurality of switches arranged on the steering wheel to produce control signals;
   (b) an encoder provided on the steering wheel and connected to each of said switches for outputting a separate pulse code signal in response to each one of the control signals generated from said switches;
   (c) electricity-to-light converting means comprising a single light producing element for converting each pulse code signal from said encoder into an optical signal;
   (d) light-transmitting ring made of a material with a high light-transmittivity and positioned between the steering wheel and the steering post, receiving the optical signal emitted from said electricity-to-light converting means, and transmitting the optical signal throughout said light-transmitting ring, said light transmitting ring having a first flat surface and a second flat surface, the light-emitting surface of said electricity-to-light converting means being mounted on the first flat surface and a depression being formed on the second flat surface of said light-transmitting ring;
   (e) light-to-electricity converting means comprising a single light receiving element for converting the optical signal transmitted throughout said light-transmitting ring into an electrical signal, said depression formed on the second flat surface of said light-transmitting ring facing the light-emitting surface of said electricity-to-light converting means; and
   (f) a decoder for decoding the electric signal converted by said light-to-electricity converting means to output an electrical signal corresponding to one of said control signals to control any of the electric loads required in the automotive vehicle,
   whereby a plurality of control signals are transmitted from the steering wheel to the steering post via said electricity-to-light converting means and said light-to-electricity converting means.

30. An optical signal transmission system for an automotive vehicle as set forth in claim 29, wherein said depression is conical.

31. An optical signal transmission system for an automotive vehicle as set forth in claim 29, wherein the depression is hemispherical.

* * * * *